J. G. MALOY.
Animal-Traps.
No. 147,280. Patented Feb. 10, 1874.
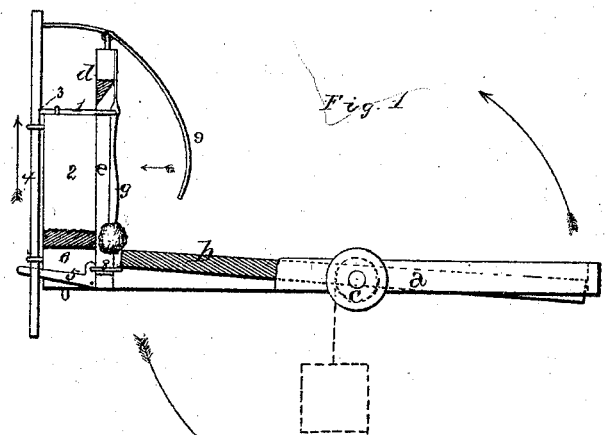
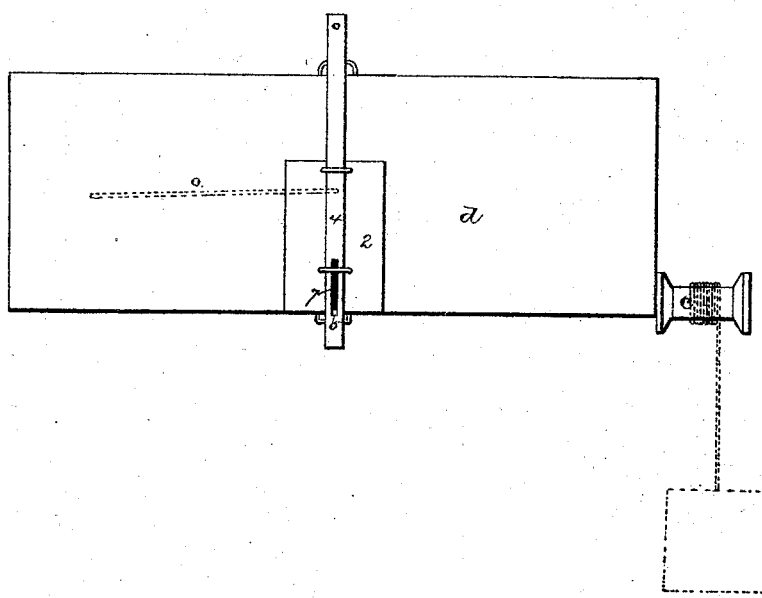
WITNESSES.
Wm Hale,
J. Wm Garner.
INVENTOR.
J. G. Maloy.

UNITED STATES PATENT OFFICE.

JAMES C. MALOY, OF JOHNSTOWN, PENNSYLVANIA.

IMPROVEMENT IN ANIMAL-TRAPS.

Specification forming part of Letters Patent No. 147,280, dated February 10, 1874; application filed January 9, 1874.

*To all whom it may concern:*

Be it known that I, JAMES C. MALOY, of Johnstown, in the county of Cambria and State of Pennsylvania, have invented certain new and useful Improvements in Animal-Traps; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in animal-traps; and it consists in the arrangement and combination of devices, which will be more fully described hereafter, whereby a cheap, simple, and efficient trap is produced, which is adapted to catching animals of all kinds.

Figure 1 represents a side elevation of my invention, part being broken away so as to better show the operation of the devices. Fig. 2 is a rear view of the same.

*a* represents a frame of any suitable size or shape, which is intended to be placed upon the top of a box, barrel, or any other suitable receptacle, into which the animals will fall. Pivoted in this frame is the revolving trap-door *b*, which has a spool, *c*, and weight, or a spring of any suitable kind, attached to one of its journals, in the usual manner, so as to cause the door to reset after having been sprung. Secured to the rear side of the frame *a* is the vertical end piece *d*, which has an opening, *e*, through its center, in front of which is suspended the spring lever *g*, upon which the bait is placed. Attached to this lever is a horizontal bar or trigger, 1, which rests upon the top of the block 2, the rear end of which catches under a shoulder, 3, formed in the side of the vertically-moving bar 4, and holds it in an elevated position. Pivoted at the bottom of the piece *d* is a bell-crank lever, 5, the rear end of which extends outward through a slot, 6, cut in the bottom of the block, and projects through a slot, 7, cut in the lower end of the bar 4. To the short end of this lever is secured a trigger, 8, which projects through the front side of the piece *d*, and upon which the trap-door catches, and is supported in a horizontal position, as shown in Fig. 1. Pivoted upon the top of the piece *d* is a curved lever, 9, which has its rear end fastened to the bar 4, while its front end projects outward over the trap-door.

The animal steps upon the trap-door, and, pulling at the bait, draws the spring-lever *g* outward, and thus pulls the trigger 1 from under the shoulder 3 on the bar. The bar being thus released, instantly falls, and, striking upon the rear end of the lever 5, jerks the trigger 8 from under the door, which, being acted upon both by the weight of the animal and the weight or spring, flies around, as shown by the arrows. As the door flies around it strikes against the downwardly-curved lever 9, which forces the bar upward, and this bar, acting upon the lever 5, forces the trigger 8 inward in time to catch the door, which is thus reset.

In case the bar 4 should not be sufficiently heavy, a flat spring, *o*, shown by dotted lines in Fig. 2, can be used to make it act more quickly.

Having thus described my invention, I claim—

1. The combination of the levers *g* 9, trigger 1 with bar 4, lever 5, and trigger 8, when constructed substantially as set forth.

2. The combination of the frame *a*, revolving door *b*, end piece *d*, with the lever *g*, trigger 1, bar 4, lever 5, trigger 8, lever 9, and block 2, all constructed substantially as shown and described.

In testimony that I claim the foregoing I have hereunto set my hand this 9th day of January, 1874.

J. C. MALOY.

Witnesses:
  F. A. LEHMANN,
  WM. HALE.